United States Patent [19]
Fitch

[11] Patent Number: 5,633,909
[45] Date of Patent: May 27, 1997

[54] APPARATUS AND METHOD FOR GENERATING CALLS AND TESTING TELEPHONE EQUIPMENT

[75] Inventor: Todd M. Fitch, Sunnyvale, Calif.

[73] Assignee: Centigram Communications Corporation, San Jose, Calif.

[21] Appl. No.: 413,464

[22] Filed: Mar. 28, 1995

Related U.S. Application Data

[63] Continuation of Ser. No. 261,442, Jun. 17, 1994, abandoned.
[51] Int. Cl.$^6$ .............................. H04M 1/24; H04M 3/08; H04M 1/64
[52] U.S. Cl. ......................... 379/15; 379/1; 379/6; 379/10; 379/67; 379/88; 379/89
[58] Field of Search ........................... 379/9–18, 1, 6, 379/21, 22, 67, 88, 89

[56] References Cited

U.S. PATENT DOCUMENTS

| | | | |
|---|---|---|---|
| 4,021,624 | 5/1977 | Kelly | 379/18 |
| 4,314,110 | 2/1982 | Breidenstein | 379/18 |
| 4,406,925 | 9/1983 | Jordan | 379/69 |
| 4,481,384 | 11/1984 | Mathews | 379/198 |
| 4,580,012 | 4/1986 | Mathews et al. | 379/88 |
| 4,580,016 | 4/1986 | Williamson | 379/31 |
| 4,629,836 | 12/1986 | Walsworth | 379/12 |
| 4,670,898 | 6/1987 | Pierce | 379/22 |
| 4,790,003 | 12/1988 | Kepley | 379/88 |
| 5,157,708 | 10/1992 | Garthwaite | 379/21 |
| 5,218,616 | 6/1993 | Stephens | 379/21 |
| 5,222,120 | 6/1993 | McLeod | 379/89 |

OTHER PUBLICATIONS

Ameritec Corporation; "Ameritec AM2–A Analog Bulk Call Generator" brochure; #089210M.
"Amis–Analog Protocol" Version 1, Issue 2, Feb. 1992.

*Primary Examiner*—Curtis Kuntz
*Assistant Examiner*—Vijay Shankar
*Attorney, Agent, or Firm*—Flehr Hohbach Test Albritton & Herbert LLP

[57] ABSTRACT

A testing system, also known as a call generator, generates telephone calls to test telephone equipment. The call generator includes a processor, a memory for storing processor procedures and test cases, and a communication interface. The procedures include a test case procedure for calling a system under test (SUT), interacting with the SUT, and accessing voice mailboxes located in the SUT. The call generator sends messages to the SUT. Then the call generator calls the SUT to once again access the voice mailboxes, and retrieves the stored messages. The call generator compares the retrieved messages with the delivered messages, or parameters representative of the delivered messages, to verify the retrieved messages. The call generator also has the capability to store, communicate, and verify other types of electronic information including facsimiles and electronic mail. The call generator may also operate on a network for communicating test cases and other database information to and from other users. The call generator and method are also applicable to testing private branch exchanges (PBX) and other telephone equipment.

28 Claims, 7 Drawing Sheets

APPARATUS AND METHOD FOR GENERATING CALLS AND TESTING TELEPHONE EQUIPMENT

This is a continuation of application Ser. No. 08/261,442 filed Jun. 17, 1994 abandoned.

FIELD OF THE INVENTION

The present invention relates generally to testing hardware and software systems. More particularly, the invention relates to testing telephony equipment including voice mail systems, interactive messaging systems, private branch exchange (PBX) systems, and other telephonic based systems.

BACKGROUND OF THE INVENTION

Many contemporary telephone systems are capable of routing hundreds of calls per second, transferring calls to alternate locations, and conferencing additional parties into the initial telephone call. To test these telephone systems, bulk call generators have been developed. Bulk call generators typically comprise a call generator that uses DTMF (dual tone multi frequency) tones to call a System Under Test (SUT). A typical bulk call generator is capable of generating thousands of calls per hour in order to fully test the switching capability of the SUT.

Even newer telephone systems include interactive requests that instruct a caller to press specific keys on a DTMF touch tone pad in order to select services, business departments, or identified persons. Additional features have been developed including voice mail. Voice mail is a system permitting a person to leave an outgoing message indicating that he is away from his desk and requesting the caller to leave a message. Usually, the person can also indicate that the caller may dial "0" to get personal help from an operator. If the caller leaves a message, it is stored by the voice mail system for later retrieval. The person for whom the message was left can then call from any telephone and retrieve the message by keying in the correct sequence of keys on a DTMF touch tone pad.

Voice message systems are computer based systems. As these telephonic systems become more sophisticated and more capable, there is an increasing need to properly test the equipment while it is being developed and before it is shipped to the customer. Testing is important to insure quality and capability of the systems for delivery.

Current testing techniques described above, where simply a large numbers of calls are placed, do not adequately test these interactive and voice message feature telephone systems. What is needed is a call generator capable of storing and communicating a variety of audio and electronic information to a SUT, and capable of verifying proper storage of that information by the SUT.

SUMMARY OF THE INVENTION

The present invention describes an apparatus and method for generating calls and testing telephone equipment. A call generator employing the present invention is capable of storing non-DTMF or electronic voice information, communicating non-DTMF or electronic voice information to a system under test (SUT), delivering non-DTMF or electronic voice messages to the SUT, verifying proper message storage, retrieving messages, and verifying proper message retrieval.

The call generator comprises a processor (CPU), memory, system under test (SUT) communication interface, and user interface. The user interface can be a keyboard and monitor, a cable connector for connection to a computer or a control panel for user input and modification of a test case defining testing parameters. An example test case contains the numbers to be called, the mail boxes to be accessed, and the messages to be delivered and retrieved.

In setup, the call generator is connected to a SUT. The SUT may be as complex as a complete Private Branch Exchange (PBX) system with an interactive voice response unit (IVR) and a voice mail system (VMS), or as simple as a single voice mail system. The call generator's memory is also loaded with at least one test case that defines the testing parameters.

In operation, the call generator's processor executes the test case and makes a call according to the test case. Typically, the call will be made using a DTMF tone sequence. Once the call is initiated, the SUT services the call, the call generator interacts with any interactive features of the SUT, and the call generator delivers a message defined by the test case to a voice mailbox. A unique feature of the present invention is its ability to communicate both DTMF tone information and non-DTMF information to the SUT and to verify storage of non-DTMF information by the SUT. Because of this feature, the call generator can deliver a non-DTMF message to a voice mailbox, such that the message will not accidently be interpreted by the SUT as a service request.

Once the call generator has accessed the desired voice mailbox, the call generator delivers a message to be stored therein. The call generator then calls back the number and retrieves the message. The call generator compares the retrieved message to the delivered message in order to verify proper storage and retrieval of the message. Message verification is performed by the processor executing one of a variety of signal processing procedures described under the detailed description of the invention.

Another embodiment of the present invention includes electronic information storage, communication and retrieval. In this context, electronic information includes facsimiles or electronic mail. The present invention can deliver, retrieve, and verify such information.

An additional embodiment of the present invention includes a network for the call generator. The network can provide the call generator with access to test cases, documents, and other information stored in remote locations or used by other test engineers on the network.

The method of the present invention describes steps for performing call generation to test telephony equipment.

DETAILED DESCRIPTION OF THE PREFERRED EMBODIMENTS

The present invention describes an apparatus and method for generating calls and testing telephone equipment. A call generator employing the present invention is used for testing telephone equipment, and is particularly useful for testing an interactive voice message system. The present invention can also be used to test a variety of telephone equipment in addition to interactive voice message systems.

Figure 1:
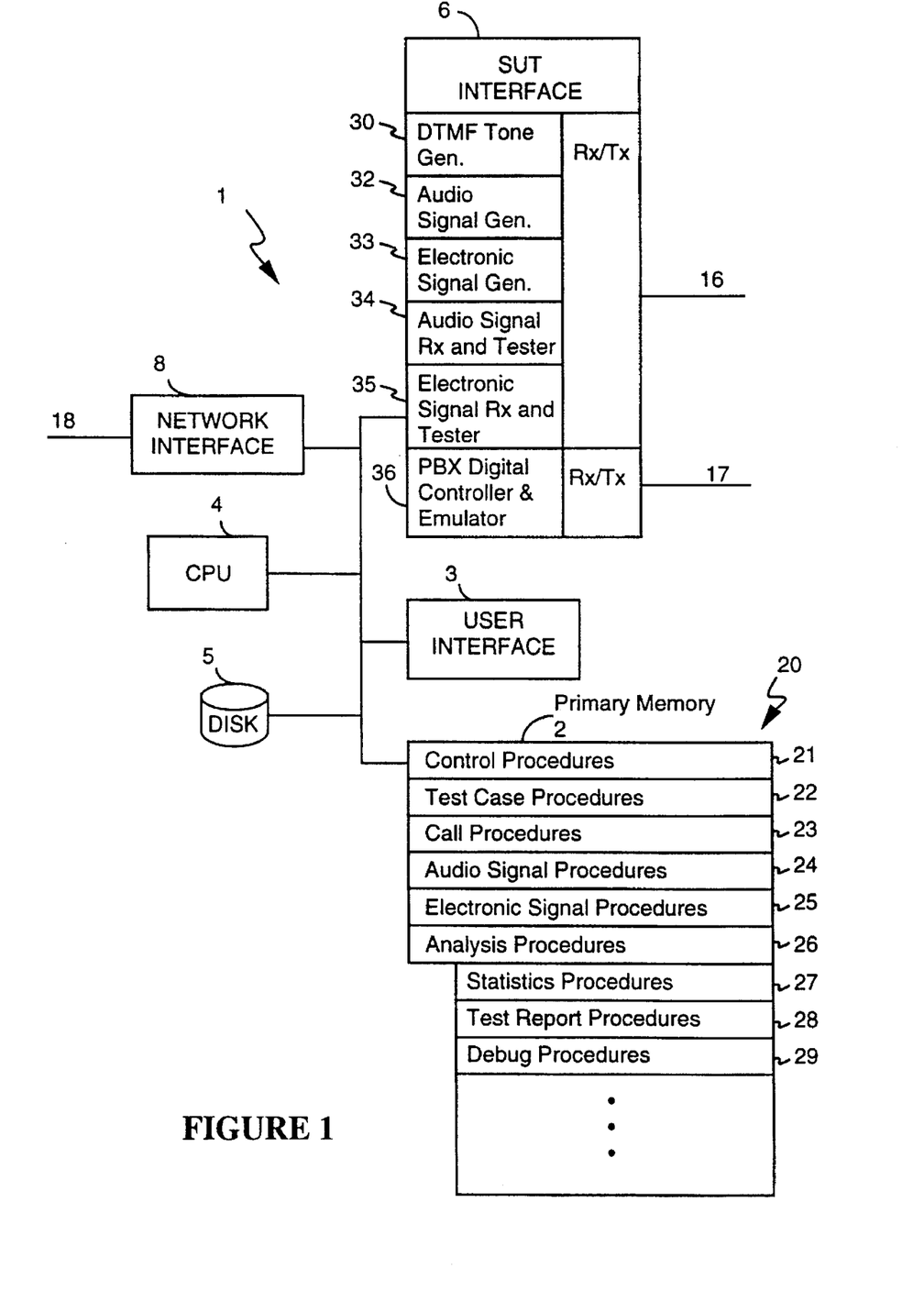
FIG. 1 is a block diagram of a call generator including a plurality of procedures.

FIG. 1 depicts a call generator 1 having a primary memory 2, a user interface 3, a central processing unit (CPU) 4, a disk memory 5, and a system under test (SUT) interface 6. Communication line 16 is a communication path to a SUT. An auxiliary communication channel 17 provides an additional communication path to a SUT. Network interface 8 can be used to connect the call generator 1 to a computer network via network channel 18.

Primary memory 2 stores a plurality of procedures 20. These procedures include control procedures 21, test case procedures 22, call procedures 23, audio signal procedures 24, electronic signal procedures 25, and analysis procedures 26. Included in the analysis procedures 26 are statistics procedures 27, test report procedures 28, and debug procedures 29. The control procedures 21 are for controlling the operation of the call generator 1. The test case procedures 22 define the parameters of a test. Call procedures 23 are for generating a call according to the test case. Audio signal procedures 24 are for generating and verifying audio signals including an electronic voice. Electronic signal procedures 25 are for generating and verifying electronic information including facsimiles and electronic mail. Analysis procedures 26 are for evaluating the operation of the call generator and SUT. The statistics procedures 27 obtain and organize information related to the performance of the call generator and SUT, and the test report procedures 28 compile test and performance information into a predefined format for the user. Debug procedures 29 assist in the implementation, troubleshooting, and testing of the test case and SUT.

The test case procedures 22 are test cases typically written in a high level computer language that include commands to store information, retrieve information, dial a number, communicate information, and verify information. A test case of the present invention is called a script that commands the call generator 1 to take the types of actions described in this specification. While the actual programming language may vary with the application, there are many programming languages known in the art that can effect the present invention.

The SUT interface 6 includes a number of components such as a DTMF tone generator 30 that sends DTMF tones to the SUT via the communication channel 16. An audio signal generator 32 generates audio frequency signals on the communication channel 16. An electronic signal generator 33 generates electronic signals on the communication channel 16. An audio signal receiver and tester 34 performs verification tests on audio frequency signals received from the SUT on communication channel 16. An electronic signal receiver and tester 35 performs verification tests on electronic signals received from the SUT on communication channel 16. And a PBX controller and emulator 36 sends and receives PBX control and information signals via the auxiliary communication channel 17.

An "electronic voice" refers to any recorded, digitized, or synthesized creation or storage of any information or communication resembling the frequency or tone characteristics of the human voice. The call generator of the preferred embodiment uses the audio signal generator 32 in the SUT interface 6 to generate an electronic voice under the control of the audio signal procedures 24 stored in memory 2. In the preferred embodiment the audio signal generator 30 has a specified address for receiving data from the CPU 4 and a digital to analog converter circuit for converting digital signals into analog signals for transmission over the communication channel 16.

The audio signal procedures 24 include procedures for transmitting prerecorded messages by sending stored digital audio data to the digital to analog (D/A) converter in the audio signal generator 32 and then transmitting the results over the communication channel 16. The audio signal procedures 24 also include text-to-speech conversion procedures for converting any specified text into a sequence of digital signals, sending those digital signals to the digital to analog converter 32 in the audio signal generator 32 and then transmitting the results over the communication channel 16. An advantage of using an electronic voice is that the test simulates the intended application of the SUT. Another advantage of using an electronic voice is that the SUT will not accidentally interpret the communication as a service request since the electronic voice does not mimic DTMF tones.

The audio signal procedures 24 are also capable of generating "non-DTMF tones." Non-DTMF tones refer to any tone that is not within the defined set of DTMF tones. These non-DTMF tones are also advantageous for message communication since the SUT will not accidentally interpret the communication as a service request.

Electronic signal procedures 25 include procedures for transmitting stored information by sending stored electronic data to the electronic signal generator 35 and then transmitting the results over the communication channel 16. The stored information is any electronic information including facsimiles and electronic mail. Moreover, the communication channel can be an analog channel or a digital channel.

In the case of an analog channel, the electronic signal generator includes a D/A convertor to convert the stored information to analog and transmit the results over the communication channel 16. In the case of a digital channel, the electronic signal generator formats the data for the communication protocol and transmits the results over the communication channel 16. It is also possible to have a combination of analog and digital communication.

In a preferred embodiment, the user interface 3, which is coupled to the CPU 4, includes a keyboard, monitor and printer. The keyboard and monitor serve to permit the input and modification of test cases while the monitor and printer give the user access to information including test cases, test reports, statistics, and other system information. In some embodiments, a control panel could be used in place of the monitor and keyboard.

Figure 2:
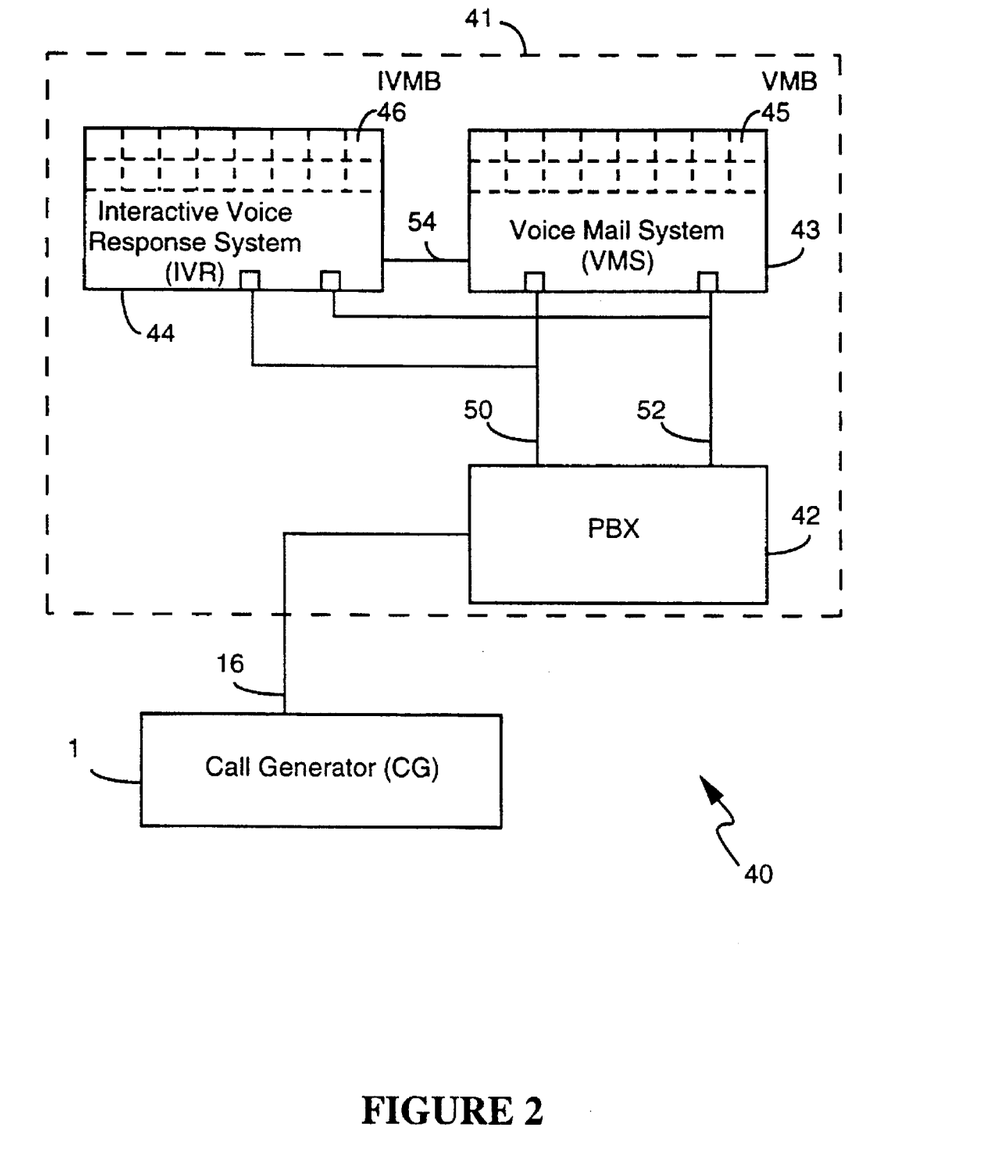
FIG. 2 is a block diagram of a test configuration showing a call generator and a system under test. The system under test includes a PBX, an interactive voice response system and a voice mail system.

FIG. 2 shows a call generator 1 in a testing environment 40. The call generator 1 is coupled to a system under test (SUT) 41 by a communication channel 16. The SUT 41 in FIG. 2 comprises a private branch exchange (PBX) 42, a voice mail system (VMS) 43, and an interactive voice response unit (IVR) 44. The VMS 43 and IVR 44 both have a plurality of accessible voice mailboxes 45 and 46, respectively, that are independently interactive. That is, voice interactions can be different for different boxes and messages are separately stored in each mailbox 45 or 46. Communication lines 16 and 50 carry both Dual Tone Multi Frequency (DTMF) and non-DTMF information. Control lines 52 and 54 carry control information such as extension assignment information and voice mailbox identification information.

During test setup, the call generator 1 is connected to a SUT 41 as shown in FIG. 2, and a test case is loaded into the call generator memory 2 (see FIG. 1). While the SUT 41 may include a complete Private Branch Exchange (PBX) and interactive voice messaging systems 43, 44, in other tests the SUT may be a single voice mail system. A test case is a file defining testing parameters and a sequence of actions to be performed. For example, a test case will typically contain telephone numbers to be called, mail boxes to be accessed, and messages to be delivered and retrieved. The execution of a test case is described below with reference to the flowcharts of FIGS. 3, 5 and 6.

Figure 3:
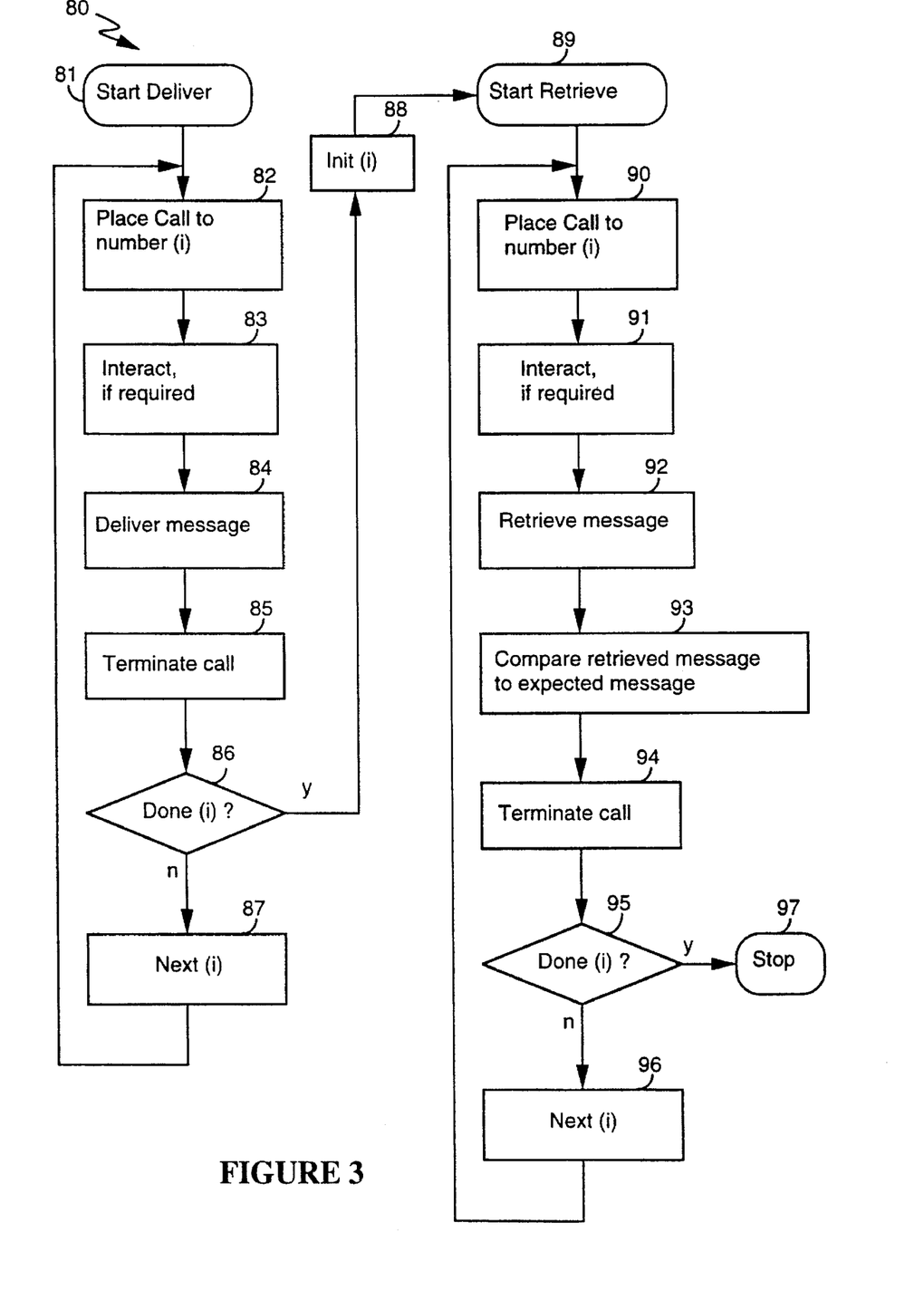
FIG. 3 depicts a flowchart diagram of the operation of the call generator executing a test case.

FIG. 3 shows a flowchart 80 of the call generator 1 processing a test case. The operation of the call generator will be described with reference to this flowchart 80, the call generator diagram FIG. 1, and the test configuration shown in FIG. 2. The beginning of the test case operation of flowchart 80 begins with step 81. This step initializes (i) to the first number to be called. Step 82 instructs the processor 4 to make a call over communication line 16. In other words, in step 82 the processor 4 instructs the DTMF tone generator 30 to generate and transmit a sequence of DTMF tones representing the telephone number or PBX extension number (i). The DTMF tones inform the PBX 42 of the desired calling number (i). Once the PBX recognizes that the DTMF tones are associated with a valid extension number, the PBX switches to form a connection between communication line 16 and communication line 50.

In step 83 the call generator reacts to any VMS 43 or IVR 44 inquiry by transmitting any additional DTMF tones necessary to complete the call. For example, the IVR or VMS may request for the caller to send a DTMF tone "1" to indicate that the caller has DTMF tone capability. Another example is that the VMS may request the user to "enter" or transmit a DTMF tone indicating a password, a priority level of the message to be stored, or other information. An interactive message may also, for example, request that the caller send a sequence of DTMF tones to access a particular extension or to leave a message in a particular voice mailbox 45. The PBX 42 will send control information over control line 52 corresponding to the additional information. The PBX control information includes the call specified extension, if any, and the specified voice mailbox 45. In the case that there is no interaction required, the test case continues past step 83.

Step 83 can also store performance data, e.g., regarding the SUT's response time, for analysis by the call generator 1. This is generally accomplished as a three step procedure. First, send a DTMF digit to make a menu selection. Second, record the response. And third, measure the duration of silence at the beginning of the recorded response. This third step is done by listening for consecutive speech frames until the call generator recognizes that the silence has ended.

Once the specified number is accessed, the receiving telephone (if any) will ring. Since there is no one to answer the telephone in the SUT 41, the IVR 44 communicates to the call generator that no one has answered the call. If the additional information required by any IVR requirements has been satisfied, the call generator can leave a message in the specified voice mailbox 45. In step 84, the call generator delivers a message to the voice mailbox 45. The message is preferably an electronic voice message, but could be a non-DTMF tone message, an electronic message, or a combination of these. Electronic voice messages are generated by the processor 4 executing the audio signal procedures 24 stored in call generator memory 2. Electronic messages are generated by the processor 4 executing the electronic signal procedures 25 stored in call generator memory 2. The message can be of any duration. After the call generator 1 delivers its message, step 85 terminates the call.

Alternatively, step 84 may not involve leaving a message. This feature is useful, for example, if the purpose of the test is to determine the raw number of calls that the SUT can handle.

Step 86 decides if the deliver loop is done. The criteria for this decision is based on the test case. The test case can have anywhere from a single number to call, up to a long series of numbers to call. Assuming that there is another number to call, step 86 continues the processing to step 87 where the calling number is set to the next number to be called. After setting (i) to the next number to be called, the call sequence begins again. The deliver loop continues until the decision at step 86 finds the criteria satisfied for departing the deliver loop. This iterative calling process is designed to fully test a SUT by calling all valid numbers and leaving messages in each of the voice mailboxes. Once all the required numbers have been called and messages left, step 86 informs the processor 4 to move to step 88.

When step 86 causes the processing to depart the deliver loop, step 88 initializes the variable (i) to the same initial number that was used in the deliver process, and step 89 begins the retrieve process. Step 90 begins the calling sequence at the initial value for (i) that was used in the deliver process. The calling sequence is similar to that of step 82, where a call is placed to number (i) using a DTMF tone sequence.

In the retrieve process, interactive step 91 is executed if step 84 delivered a message for storage by the SUT and the test case requires retrieval of the previously delivered message. Step 91 typically involves sending a password to the SUT, by transmitting a corresponding DTMF tone sequence. A password is required by many voice and electronic mail systems in order to retrieve the message stored therein. An additional interaction may be required to actually retrieve the message. This is also handled by communicating a DTMF tone or DTMF tone sequence that the SUT recognizes. Step 92 retrieves the message, and the retrieved message is then communicated over the communication line 16 to the call generator 1. Steps 91 and 92 can also store response time performance data for analysis by the call generator 1, as described above with respect to step 83.

Step 93 involves comparing the retrieved message with the message that was delivered to the particular voice mailbox, or with parameters representing the delivered message. There are a number of methods for accomplishing the comparison, and verifying that the retrieved message is substantially identical to the delivered message. A preferred method is time domain processing. The simplest time domain processing technique is to verify that some amount of information is retrieved from the voice mailbox. A first way of performing this technique is with an integrating operational amplifier. The incoming information is integrated over time and once the sum of the incoming information passes a predetermined threshold, the call generator considers this as evidence of verification. The integrating op-amp technique can verify that the power signature of the retrieved message is substantially equal to the expected power signature of the retrieved message. The integrating op-amp technique can also be employed to verify that the retrieved message is of equal duration to that of the delivered message, by observing the op-amp's output near the expected completion time of the retrieved message.

A more sophisticated time domain technique involves using an analog to digital (A/D) converter to sample the retrieved information and verify that information is present. Any variation in the A/D output will signify the presence of information, and once there is sufficient A/D output, the call generator considers this as evidence of verification. Again, this technique can be employed to verify that the retrieved message is of equal duration to that of the delivered message, by observing the A/D's output near the expected completion time of the retrieved message. An even more sophisticated technique involves using the A/D converter to sample the retrieved message in order to correlate the samples against the delivered message. This technique can be performed on selected time slices of the retrieved message, or on the entire retrieved message. If a time slice technique is used, for example, the first one second of the retrieved message is compared directly against time domain samples of the delivered message for the first one second. Then the samples are compared for every tenth second, and so on. This technique can be performed on the entire message, by comparing every predefined time segment, if so desired. Again, this technique can be employed to verify that the retrieved message is of equal duration to that of the delivered message, by observing the samples near the expected completion time of the retrieved message. In the present technique, verifying the samples near the expected completion time of the retrieved message is important when testing the message capacity of the SUT.

Another time domain technique, using an ND converter, involves summing the ND output to determine the power of the sampled information. This can be compared with the power of the time domain samples of the delivered message. Alternately, the power associated with portions of the received message can be compared with the power of corresponding portions of the delivered message.

An alternate method of message verification is frequency domain processing. This method involves sampling the retrieved information and transforming the samples into the frequency domain. This is performed using a signal processing device such as the Texas Instruments TMS320C30 with a sampling rate of 1 millisecond and a Fast Fourier Transform (FFT) size of 1024 points. The sample rate and transform size can be modified with good results, and a Discrete Fourier Transform (DFT) can be used in place of the FFT. Once the samples are transformed, extracted frequency characteristics are used to verify that the retrieved message is substantially the same as the delivered message. Frequency domain processing can include matching fundamental frequencies of the delivered message to that of the retrieved message. Frequency domain processing can also include matching the spectral envelopes of the delivered message to that of the retrieved message.

In the case of electronic information, the procedures listed above are equally applicable. Also, other procedures can be applied. Electronic information that includes electronic mail can be verified by direct text comparison. Since facsimiles are usually retrieved as printer command streams, rather than as the sequence of codes in which the facsimile is stored, electronic information that includes a facsimile can be verified by optical character recognition or equivalent techniques.

Once the message is verified, step 94 terminates the call. If all the numbers (i) have been called, step 95 terminates the test case. If there remain numbers to be called, step 96 sets (i) to the next number to be called, and the processor begins back at step 90 by calling the next number (i) to retrieve a message stored in that voice mailbox.

An analysis of the test case execution is performed by the call generator 1. The procedures for executing the analysis are stored in memory 2 and comprise statistics procedures 27, and test report procedures 28. The statistics procedures 27 maintain relevant information such as the numbers successfully called, the numbers not successfully called, the number of messages delivered, the number of verified messages retrieved, the length of the messages, and other information. The test report procedures then compile the statistics into a test report that is organized for the user to read.

Figure 4:
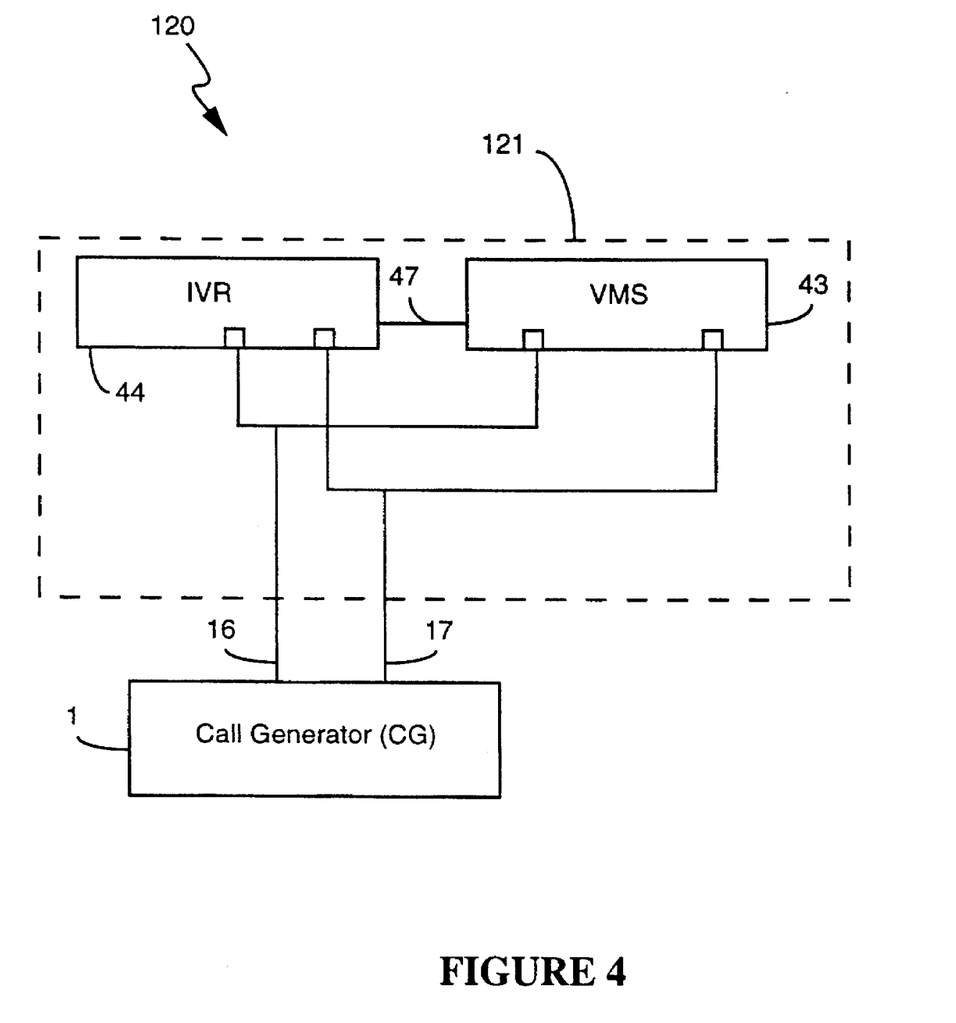
FIG. 4 is a block diagram of a second test configuration showing a call generator and a system under test. The system under test includes an interactive voice response system and a voice mail system.

FIG. 4 shows a second test configuration 120. The call generator 1 is depicted with SUT communication channels 16 and 17. The SUT 121 in the FIG. 4 comprises an interactive voice response unit (IVR) 44 and a voice mail system (VMS) 43. The communication line 16 carries both Dual Tone Multi Frequency (DTMF) and non-DTMF information. The call generator 1 also provides PBX control information over control line 17. This PBX control information includes switching control in order to directly access the IVR 44 and VMS 43. The preferred embodiment includes control parameters that can be set in the call generator's control procedures 21 to emulate a variety of PBX devices in commercial use.

Another helpful feature is direct inward dialing (DID). This feature involves the SUT providing the necessary ring voltage. DID is helpful to fully test various IVR and VMS units with different emulated PBX devices to insure proper operation of the IVR and VMS With that particular PBX at a customer's site.

Figure 5:
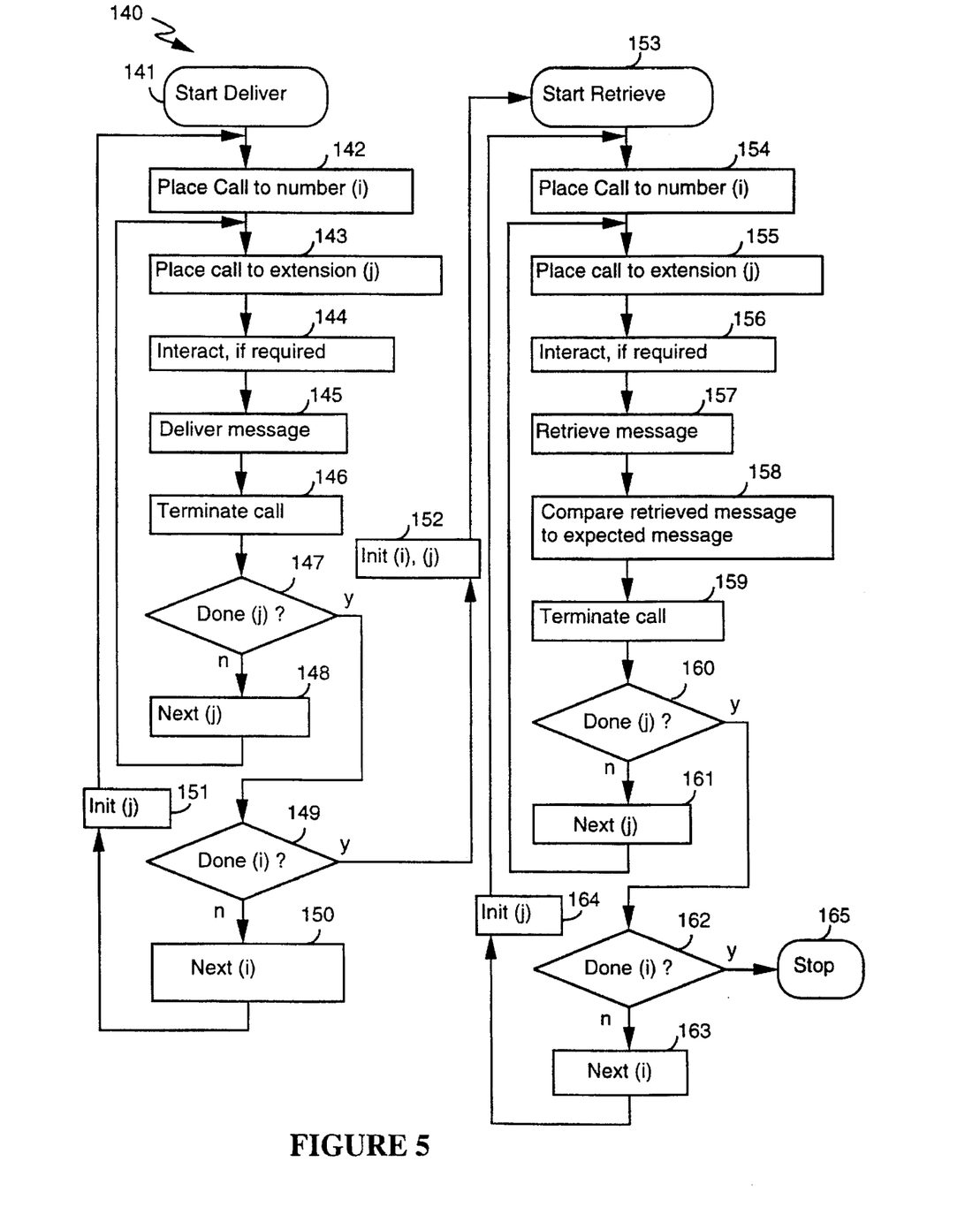
FIG. 5 depicts a second flowchart diagram of the operation of the call generator executing a second test case.

FIG. 5 shows a second flowchart 140 of the operation of the call generator. This figure depicts a second test case operation having a nested loop for calling a sequence of numbers and extensions. Insofar as FIG. 5 is similar to FIG. 3, only the differences will be discussed here. FIG. 5 shows a first loop for calling numbers based on the number (i), step 142. There is a second loop nested therein for calling extensions based on the number (j), step 143. Once the extension has been called, the message delivery takes place as in flowchart 40 of FIG. 3. The loop termination steps 147 and 149 are performed in the same way as step 86 of flowchart 40, with the modification that step 147 checks the variable (j) and step 149 checks the variable (i).

The retrieve process is similar to that of flowchart 40 with the modifications that step 160 checks the variable (j) and step 162 checks the variable (i).

Figure 6:
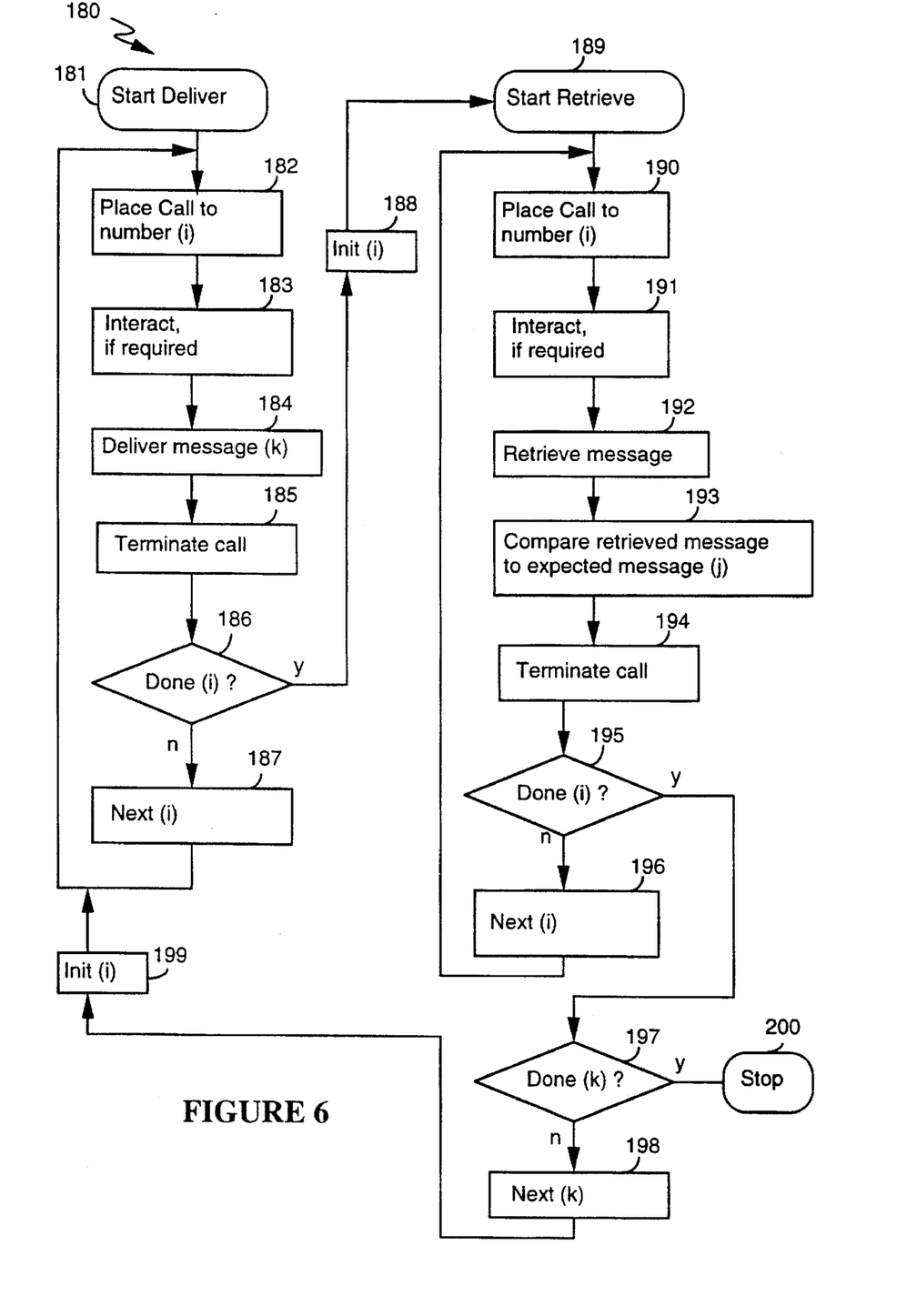
FIG. 6 depicts a third flowchart diagram of the operation of the call generator executing a third test case.

FIG. 6 shows a third flowchart of the operation of the call generator. This figure depicts a third test case operation having a loop for changing the message after a sequence of numbers have been called, messages delivered and then retrieved. Insofar as FIG. 6 is similar to FIG. 3, only the differences will be discussed here.

A deliver loop beginning with step 182 calls a number (i). In step 184, a message (k) is delivered to the voice mailbox corresponding to the called number (i). The deliver loop continues until all numbers are called and message (k) is delivered to all voice mailboxes. Then the retrieve loop begins with step 190 calling the same numbers as were called in the deliver loop. The messages are retrieved and compared against the expected message (k) in step 193. This comparison is similar to that performed in flowchart 40, step 93.

Then, in step 195, after all the numbers (i) have been tested, step 197 decides if all the messages (k) have been tested, and if not, step 198 selects the next message (k). Step 198 causes the message to change and the delivery loop to begin again with step 182. Now, the number (i) is called in step 182 and the new message (k) is delivered in step 184. In the same way as before, the (i) numbers are updated in the deliver loop, and after they have all the numbers have been called, the retrieve loop begins. This iterative process continues until all numbers and messages have been tested.

In the preferred embodiment, the test case is written so that the loop begins with short message lengths and continues to long message lengths. An example is beginning with a message k=1 that represents a five second message. Every time that k is updated at step 196, the message length increases by five seconds. Once messages of a specified length (e.g., two minutes long) have been delivered and verified, the loop is terminated. This example is meant to test the message capacity of the SUT and to verify proper delivery, handling and message retrieval.

Additional features contemplated by the preferred embodiment include the following. The test case of the preferred embodiment can be modified to include message forwarding. This feature includes delivering a message to a first voice mailbox and then calling the SLIT and instructing the SUT to forward the message to a second voice mailbox. Thereafter, the call generator calls the second voice mailbox to verify that the message was properly forwarded.

Another test case is used to test the process of changing a SUT's configuration. This is accomplished by calling the SUT and changing a variety of parameters within the SUT. For example, a test case could be set up to changes the security passwords for various voice mailboxes. The test would call the SUT, obtain access to the security features, change the password sequence for specified mailboxes, and then verify that the mailboxes were accessible using the new password(s).

Figure 7:
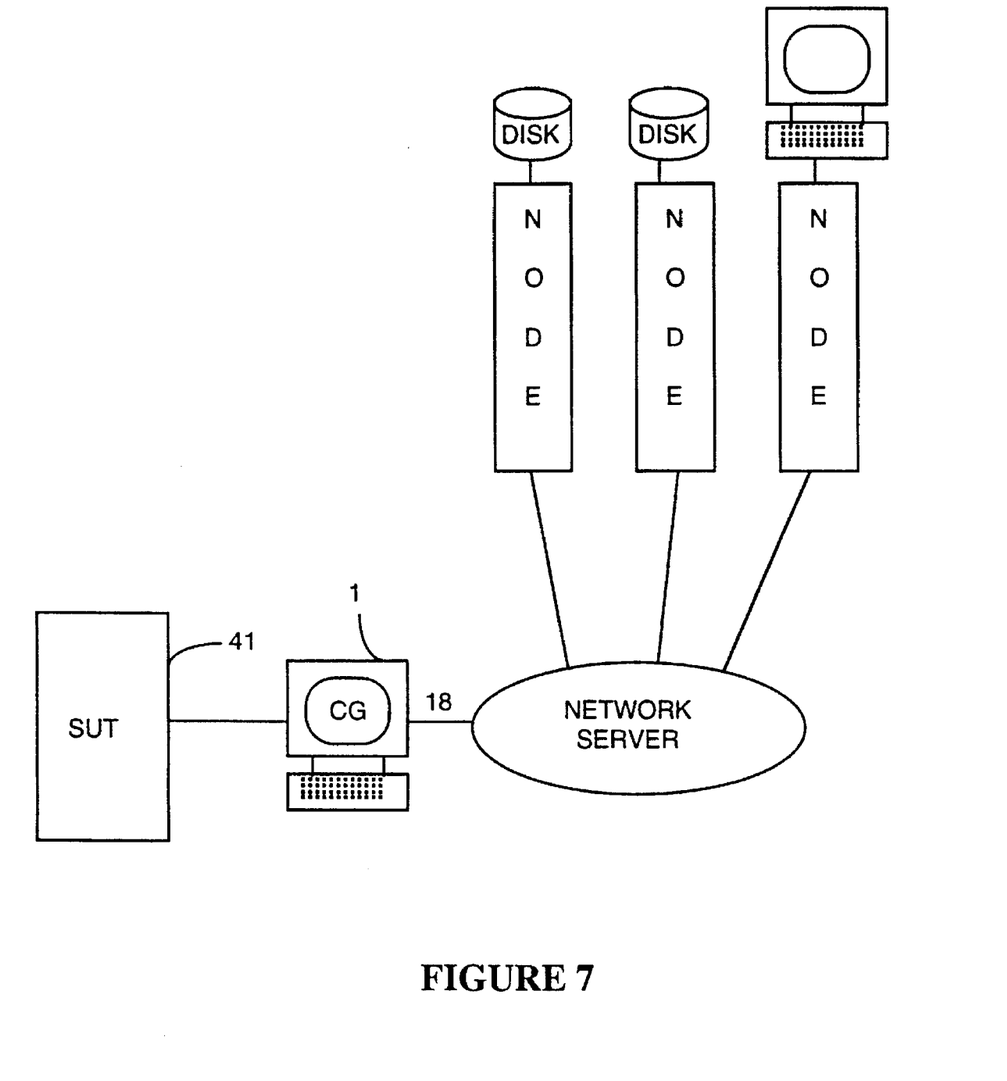
FIG. 7 is a block diagram of a network version of the call generator.

In another embodiment of the present invention, shown in FIG. 7, the call generator is coupled to a computer network. The network can provide the call generator with access to test cases, documents, and other information stored in remote locations or used by other test engineers on the network. The network can also provide for remote control of single or multiple call generators either over the network or remotely via dial-in service.

Modifications and variations may be made to the disclosed embodiments without departing from the subject and spirit of the invention as defined by the following claims.

What is claimed is:

1. An apparatus for testing telephone equipment that includes a message storage memory, said apparatus comprising:

a memory configured to store procedures;

a communication channel configured to communicate with said telephone equipment;

DTMF tone generation circuitry and non-DTMF audio signal generation circuitry, said non-DTMF audio signal generation circuitry configured to generate a message to be stored in said message storage memory; and a processor coupled to said memory, to said communication channel, to said DTMF tone generation circuitry and to said non-DTMF audio signal generation circuitry, said processor configured to execute said procedures stored in said memory and to engage in communication with said telephone equipment via said communication channel, said communication including said processor initiating a first call by sending first information to said telephone equipment via said communication channel, said first information including tones for instructing said telephone equipment to form a connection, tones for instructing said telephone equipment to switch to a requested mail box, and a delivered message for storage in said requested mail box, and said processor initiating a second call by sending second information to said telephone equipment via said communication channel, said second information including tones for instructing said telephone equipment to form a connection, tones for instructing said telephone equipment to switch to a requested mail box, and tones for instructing said telephone equipment to retrieve said message stored in said requested mail box as a retrieved message.

2. The apparatus of claim 1, wherein:

said delivered message is an electronic voice message.

3. The apparatus of claim 1, wherein:

said delivered message is one of the group consisting of an electronic voice message, a non-DTMF tone message, and a combination electronic voice message and non-DTMF tone message.

4. The apparatus of claim 1, further comprising:

verification circuitry configured to verify that said retrieved message is substantially identical to said delivered message.

5. The apparatus of claim 1, further comprising:

electronic signal generation circuitry configured to generate a second delivered message to be stored in said message storage memory; and wherein said procedures include electronic signal procedures.

6. The apparatus of claim 5, wherein:

said delivered message includes electronic information.

7. The apparatus of claim 6, further comprising:

verification circuitry configured to verify that said retrieved message is substantially identical to said delivered message.

8. The apparatus of claim 1, wherein:

said processor further creates a record of statistics relating to said communication with said telephone equipment.

9. The apparatus of claim 8, wherein:

said record of statistics include at least one of the set consisting of the number of calls made, the number of attempted calls that failed to connect, the mail boxes called, the number of messages stored, the number of messages retrieved, and the response time of the telephone equipment.

10. The apparatus of claim 1, further comprising:

a network interface configured to communicate with at least one node over a network.

11. The apparatus of claim 10, wherein:

said communication with at least one node over a network, consists of at least one of the set of retrieving testing information, and storing testing information.

12. The apparatus of claim 1, further comprising:

a second communication channel configured to communicate with said telephone equipment, said second communication channel configured to communicate PBX control signals with said telephone equipment.

13. The apparatus of claim 5, further comprising:

a second communication channel configured to communicate with said telephone equipment, said second communication channel configured to communicate PBX control signals with said telephone equipment.

14. An apparatus for testing telephone equipment that includes a message storage memory, said apparatus comprising:

a memory for storing procedures;

a communication channel for communicating with said telephone equipment;

DTMF tone generation circuitry;

electronic signal generation circuitry configured to generate a message to be stored in said message storage memory; and a processor coupled to said memory, to said communication channel, to said DTMF tone generation circuitry and to said electronic signal generation circuitry, said processor configured to execute said procedures stored in said memory and to engage in communication with said telephone equipment via said communication channel, said communication including said processor initiating a first call by sending first information to said telephone equipment via said communication channel, said first information including tones for instructing said telephone equipment to form a connection, tones for instructing said telephone equipment to switch to a requested mail box, and a delivered message for storage in said requested mail box, and said processor initiating a second call by sending second information to said telephone equipment via said communication channel, said second information including tones for instructing said telephone equipment to form a connection, tones for instructing said telephone equipment to switch to a requested mail box, and tones for instructing said telephone equipment to retrieve said message stored in said requested mail box as a retrieved message.

15. A method for testing telephone equipment that includes a message storage memory, said method comprising:

storing procedures in a memory;

executing the procedures stored in said memory;

while performing said executing step, communicating with said telephone equipment on a communication channel, said communicating step including initiating a first call by sending first information to said telephone equipment via said communication channel, said first information including tones for instructing said telephone equipment to form a connection, tones for instructing said telephone equipment to switch to a requested mail box, and a delivered message for storage in said requested mail box, and initiating a second call by sending second information to said telephone equipment via said communication channel, said second information including tones for instructing said telephone equipment to form a connection, tones for instructing said telephone equipment to switch to a requested mail box, and tones for instructing said telephone equipment to retrieve said message stored in said requested mail box as a retrieved message.

16. The method of claim 15, wherein:

said delivered message is an electronic voice message.

17. The method of claim 15, wherein:

said delivered message is one of the group consisting of an electronic voice message, a non-DTMF tone message, and a combination electronic voice message and non-DTMF tone message.

18. The method of claim 15, wherein:

said delivered message includes electronic information.

19. The method of claim 15, further comprising the step of:

verifying that said retrieved message is substantially identical to said delivered message.

20. The method of claim 15, further comprising the step of:

generating a record of statistics relating to said communication with said telephone equipment.

21. The method of claim 20, wherein:

said record of statistics include at least one of the set consisting of the number of calls made, the number of attempted calls that failed to connect, the mail boxes called, the number of messages stored, the number of messages retrieved, and the response time of the telephone equipment.

22. The method of claim 15, further comprising the step of:

communicating with at least one node over a network.

23. The method of claim 22, wherein:

said step of communicating with at least one node over a network, consists of at least one of the set of retrieving testing information, and storing testing information.

24. The method of claim 15, further comprising the step of:

communicating with said telephone equipment over a second communication channel, said second communication channel communicating PBX control signals to said telephone equipment.

25. An apparatus for testing telephone equipment that includes a message storage memory, said apparatus comprising:

a memory for storing procedures;

a communication channel for communicating with said telephone equipment;

message generation circuitry configured to generate a message to be stored in said message storage memory;

a processor coupled to said memory, to said communication channel, and to said message generation circuitry, said processor configured to execute said procedures stored in said memory and to engage in communication with said telephone equipment via said communication channel, said communication including said processor initiating a plurality of first calls by sending first information to said telephone equipment via said communication channel, said first information including an instruction to form a connection, an instruction to switch to a requested mail box, and a delivered message for storage in said requested mail box, and said processor initiating a plurality of second calls by sending second information to said telephone equipment via said communication channel, said second information including an instruction to form a connection, an instruction to switch to a requested mail box, and an instruction to retrieve said message stored in said requested mail box as a retrieved message.

26. The apparatus of claim 25, further comprising:

verification circuitry configured to verify that said retrieved message is substantially identical to said delivered message.

27. A method for testing telephone equipment that includes a message storage memory, said method comprising:

storing procedures in a memory;

executing the procedures stored in said memory;

while performing said executing step, communicating with said telephone equipment on a communication channel, said communicating step including initiating a plurality of first calls by sending first information to said telephone equipment via said communication channel, said first information including an instruction to form a connection, an instruction to switch to a requested mail box, and a delivered message for storage in said requested mail box, and initiating a plurality of second calls by sending second information to said telephone equipment via said communication channel, said second information including an instruction to form a connection, an instruction to switch to a requested mail box, and an instruction to retrieve said message stored in said requested mail box as a retrieved message.

28. The method of claim 27, further comprising the step of:

verifying that said retrieved message is substantially identical to said delivered message.

* * * * *